US009669359B2

(12) United States Patent
Szczepanski

(10) Patent No.: US 9,669,359 B2
(45) Date of Patent: Jun. 6, 2017

(54) CATALYTIC CONVERTER SUBSTRATE

(71) Applicant: DENSO International America, Inc., Southfield, MI (US)

(72) Inventor: Edward Szczepanski, Grosse Pointe Woods, MI (US)

(73) Assignee: Denso International America, Inc., Southfield, MI (US)

( * ) Notice: Subject to any disclaimer, the term of this patent is extended or adjusted under 35 U.S.C. 154(b) by 0 days.

(21) Appl. No.: 14/795,362

(22) Filed: Jul. 9, 2015

(65) Prior Publication Data
US 2015/0306543 A1    Oct. 29, 2015

Related U.S. Application Data

(63) Continuation-in-part of application No. 13/542,796, filed on Jul. 6, 2012, now Pat. No. 9,115,627.

(51) Int. Cl.
| F01N 3/00 | (2006.01) |
| B01D 53/94 | (2006.01) |
| B01J 37/02 | (2006.01) |
| B01J 35/04 | (2006.01) |
| F01N 3/28 | (2006.01) |

(52) U.S. Cl.
CPC .......... B01D 53/9454 (2013.01); B01J 35/04 (2013.01); B01J 37/0244 (2013.01); F01N 3/2828 (2013.01); B01D 2255/9025 (2013.01); F01N 2330/34 (2013.01); F01N 2330/38 (2013.01); F01N 2510/0682 (2013.01)

(58) Field of Classification Search
USPC .......... 60/274, 299, 300, 301, 311; 422/169, 422/170, 171, 177, 180
See application file for complete search history.

(56) References Cited

U.S. PATENT DOCUMENTS

| 5,633,066 A | 5/1997 | Lipp et al. | |
| 6,753,294 B1 * | 6/2004 | Brisley | .............. B01D 53/9431 |
| | | | 502/400 |
| 7,846,868 B2 * | 12/2010 | Itoh | .......................... B01J 23/63 |
| | | | 423/624 |

(Continued)

FOREIGN PATENT DOCUMENTS

| JP | S5681135 A | 7/1981 |
| JP | 2012077944 A | 4/2012 |

Primary Examiner — Binh Q Tran
(74) Attorney, Agent, or Firm — Harness, Dickey & Pierce, P.L.C.

(57) ABSTRACT

The present teachings provide for a catalytic converter for modifying the composition of exhaust gas of an engine. The catalytic converter includes a housing, a substrate body, and a first layer of catalyst material. The housing can define an inlet for receiving the exhaust gas from the engine, a main chamber in fluid communication with the inlet, and an outlet in fluid communication with the main chamber for exhausting the modified exhaust gas. The substrate body can be disposed within the central chamber and can define a plurality of flow channels. The flow channels can provide fluid communication between the inlet and the outlet. The first layer of catalyst material can provide a first section of the flow channels with a first overall wall thickness that is greater than a second overall wall thickness of a second section of the flow channels.

13 Claims, 4 Drawing Sheets

(56) References Cited

U.S. PATENT DOCUMENTS

| | | | |
|---|---|---|---|
| 2006/0057046 A1* | 3/2006 | Punke | B01D 53/944 423/215.5 |
| 2011/0212831 A1* | 9/2011 | Goto | B01D 46/2474 502/100 |
| 2013/0294990 A1* | 11/2013 | Koch | B01D 53/9477 423/213.5 |
| 2014/0004563 A1 | 1/2014 | Paripati et al. | |
| 2014/0007563 A1 | 1/2014 | Szczepanski | |
| 2015/0059321 A1* | 3/2015 | Nakayama | F01N 3/035 60/297 |

\* cited by examiner

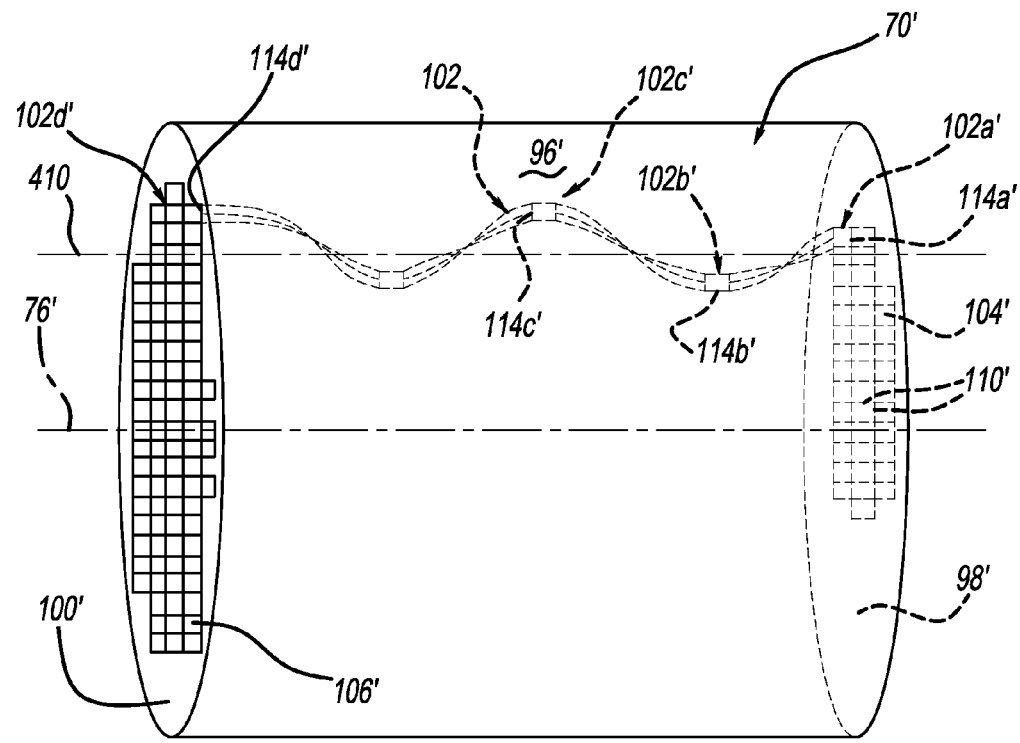
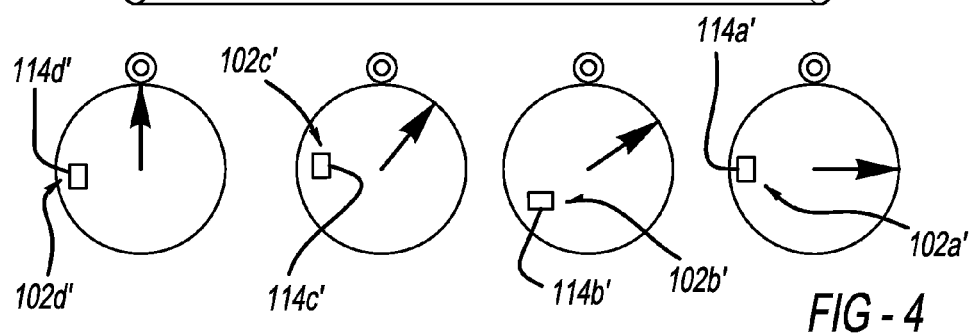
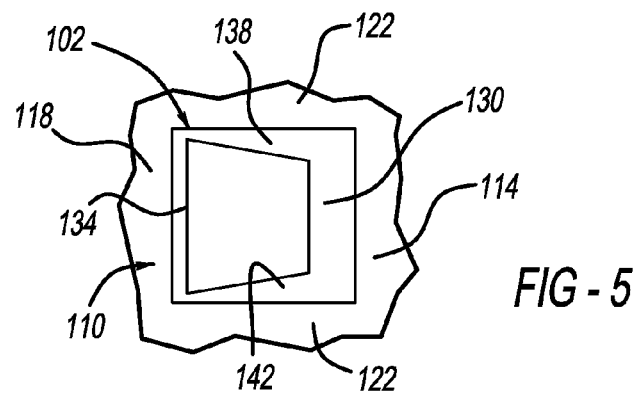
FIG - 4
FIG - 5

CATALYTIC CONVERTER SUBSTRATE

CROSS-REFERENCE TO RELATED APPLICATION

This application is a continuation-in-part of U.S. patent application Ser. No. 13/542,796 filed on Jul. 6, 2012, the entire disclosure of which is incorporated herein by reference.

FIELD

The present disclosure relates to catalytic converter substrates.

BACKGROUND

This section provides background information related to the present disclosure which is not necessarily prior art.

An internal combustion engine "ICE" (e.g. gasoline or diesel) typically includes a catalytic converter that includes a catalytic substrate having a plurality of small, parallel channels through which exhaust gases can flow. Catalytic substrates can reduce undesirable exhaust emissions (e.g. carbon monoxide "CO", unburned hydrocarbons "HC", nitrogen oxides "NOx") by catalyzing chemical reactions to create more desirable emissions (e.g. carbon dioxide "CO2", water "H2O", nitrogen gas "N2"). Catalytic substrates are typically a ceramic (e.g. cordierite) block that is extruded to form the plurality channels through which the exhaust gases flow. The internal walls of the channels are typically coated with a catalyst material that catalyzes the chemical reactions necessary to achieve the more desirable emissions when the exhaust gases contact the catalyst material.

The exhaust gases can flow through the catalytic substrate such that different channels can receive unequal contact with the exhaust gases. Additionally, flow paths through a particular channel can result in unequal contact of the exhaust gases with the various coated walls of that particular channel. This unequal contact with the exhaust gases can result in inefficient use of the catalyst material.

SUMMARY

This section provides a general summary of the disclosure, and is not a comprehensive disclosure of its full scope or all of its features. The present teachings provide for a catalytic converter for modifying the composition of exhaust gas of an engine. The present teachings further provide for a method of manufacturing a substrate body of a catalytic converter. Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 4 is a perspective view similar to FIG. 3, illustrating a flow channel path of a second construction;

FIG. 5 is a sectional view illustrating a flow channel cross-sectional shape and catalyst coating of a first construction;

Corresponding reference numerals indicate corresponding parts throughout the several views of the drawings.

DETAILED DESCRIPTION

Example embodiments will now be described more fully with reference to the accompanying drawings.

The present teachings are directed to a catalytic converter and a method of manufacturing a catalytic converter. A substrate of the catalytic converter defines a plurality of channels through which exhaust gas can flow. The channels are lined with a catalyst material. The thickness of the catalyst lining varies with location in the channels. The substrate and the catalyst lining can be three-dimensionally printed together such that the channels can follow a generally curved path through the substrate and such that the catalyst lining can be thicker in any desirable location within the substrate.

Figure 1:
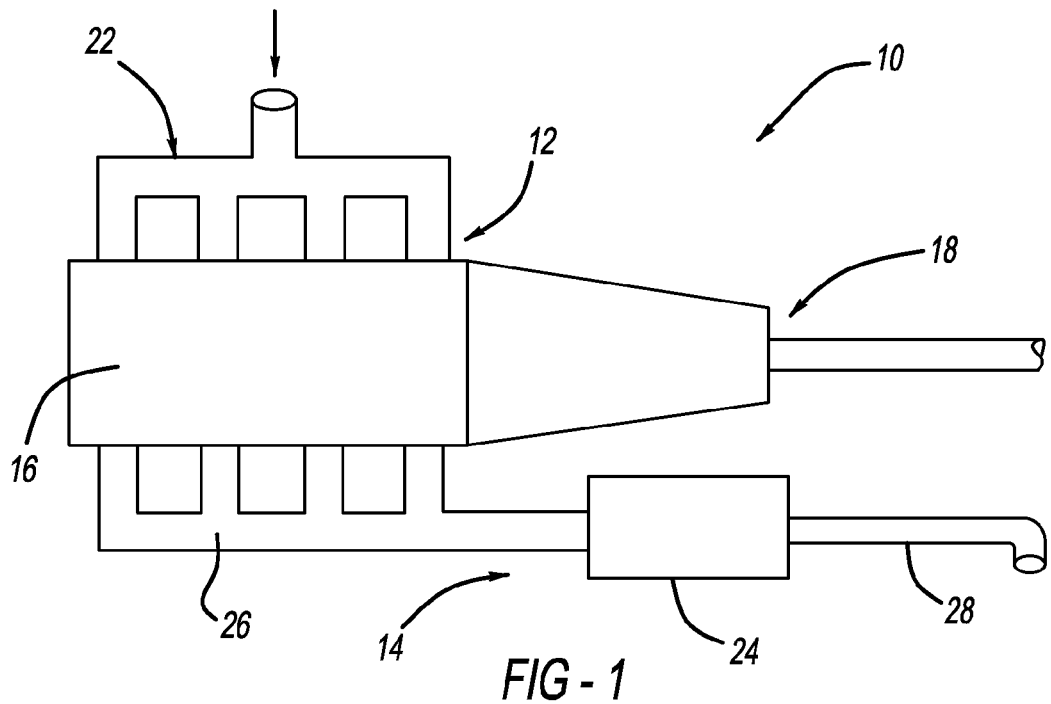
FIG. 1 is a schematic illustration of an engine and an exhaust system having a catalytic converter in accordance with the present teachings.

With reference to FIG. 1, an example of an engine assembly 10 including a powertrain 12 and an exhaust system 14. The powertrain 12 and exhaust system 14 of the present teachings can be used in any suitable device, such as a motor vehicle, stationary machinery, or a generator for example. The powertrain 12 includes an internal combustion engine 16 and a drivetrain 18 that are configured to generate and output rotational power.

The internal combustion engine 16 can include an air intake system 22 and the exhaust system 14. The exhaust system 14 can include a catalytic converter 24, an exhaust manifold 26, and a tail pipe 28. The catalytic converter 24 can be configured to treat exhaust gases of the engine 16. More specifically, the catalytic converter 24 can be configured to reduce the amount of undesirable exhaust emissions (e.g. carbon monoxide "CO", unburned hydrocarbons "HC", nitrogen oxides "NOx") in the exhaust gases by catalyzing chemical reactions of the combustion products to create more desirable emissions (e.g. carbon dioxide "CO2", water "H2O", nitrogen gas "N2"). The catalytic converter 24 can be fluidly coupled to the exhaust manifold 26 to receive exhaust gases from the exhaust manifold 26 and can be fluidly coupled to the tail pipe 28 to discharge the treated gases.

Figure 2:
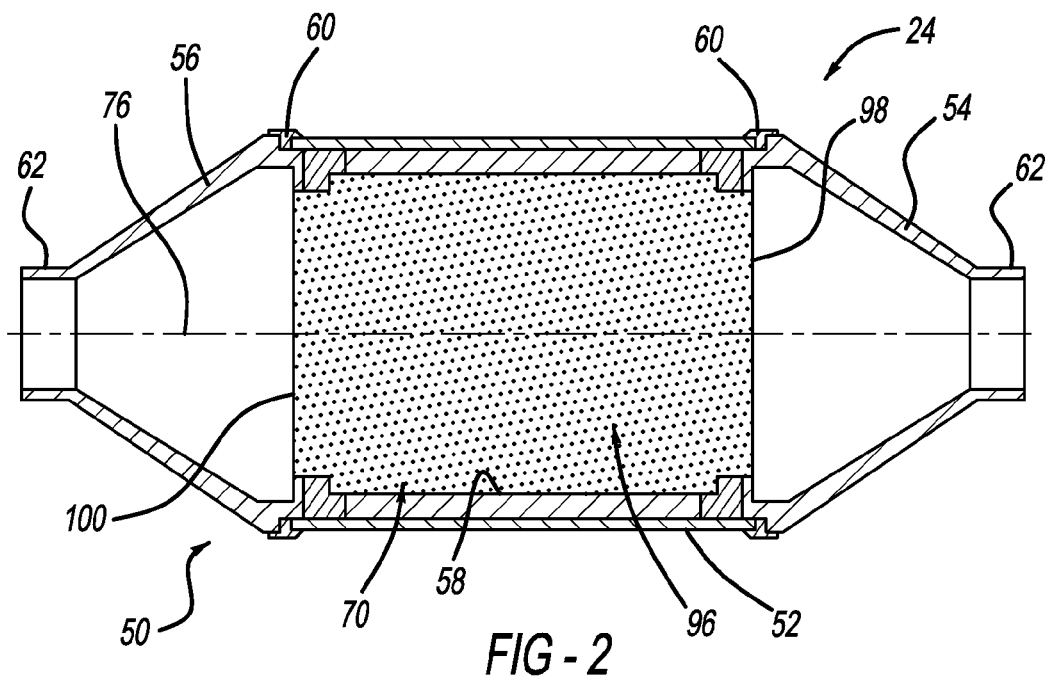
FIG. 2 is a sectional view of a catalytic converter constructed in accordance with the present teachings.

With additional reference to FIG. 2, a first exemplary construction of the catalytic converter 24 is illustrated in greater detail. The catalytic converter 24 can include an elongated housing 50 that can be fabricated from any type of material suitable for use with hot exhaust gases. The housing 50 can include multiple sections which may be fixed (i.e., welded or riveted) together. The housing 50 can include a shell 52, an inlet end cone 54 and an outlet end cone 56. In the example shown, the shell 52 is generally cylindrical in shape and has a generally circular cross-section, though the shell 52 can have other cross-sectional shapes (e.g. generally rectangular, square or oval).

Shell 52 can define an internal central chamber 58. The inlet and outlet end cones 54 and 56 can be generally conical in shape and can have a generally circular cross-section of varying diameters, though the end cones 54 and 56 can have other cross-sectional shapes. Each of the end cones 54 and 56 can taper from a first larger edge perimeter 60 to a second smaller edge perimeter 62. A portion of each end cone 54, 56 adjacent to the first larger edge perimeter 60 can be rigidly attached to a peripheral edge of the elongated shell 52 in a suitable manner (e.g. welding). The second smaller edge perimeter 62 of the inlet end cone 54 can be coupled to a portion of the exhaust system 14 (FIG. 1) to fluidly couple the inlet end cone 54 to the exhaust manifold 26 (FIG. 1). The second smaller edge perimeter 62 of the outlet end cone 56 can be coupled to a portion of the exhaust system 14 (FIG. 1) to fluidly couple the outlet end cone 54 to the tail pipe 28 (FIG. 1). Thus exhaust gases can enter the housing 50 at the second smaller edge perimeter 62 of the inlet end cone 54 and exit the housing 50 at the second smaller edge perimeter 62 of the outlet end cone 56.

A catalyst-coated substrate 70 can be located within the internal chamber 58 of the elongated housing 50. The catalytic substrate 70 can be formed from a ceramic material (e.g. cordierite) impregnated or loaded with a catalyst material as described in greater detail below. The catalyst material can perform the catalytic function in any suitable manner when exhaust gases contact the catalyst material while passing through the catalytic substrate 70. In the example provided, the catalytic substrate 70 is generally cylindrical in shape and has a generally circular cross-section, though the catalytic substrate 70 can have other cross-sectional shapes (e.g. generally rectangular, square, or oval). In the example provided, the catalytic substrate 70 and the housing 50 share a common central axis 76, though other configurations can be used.

Figure 3:
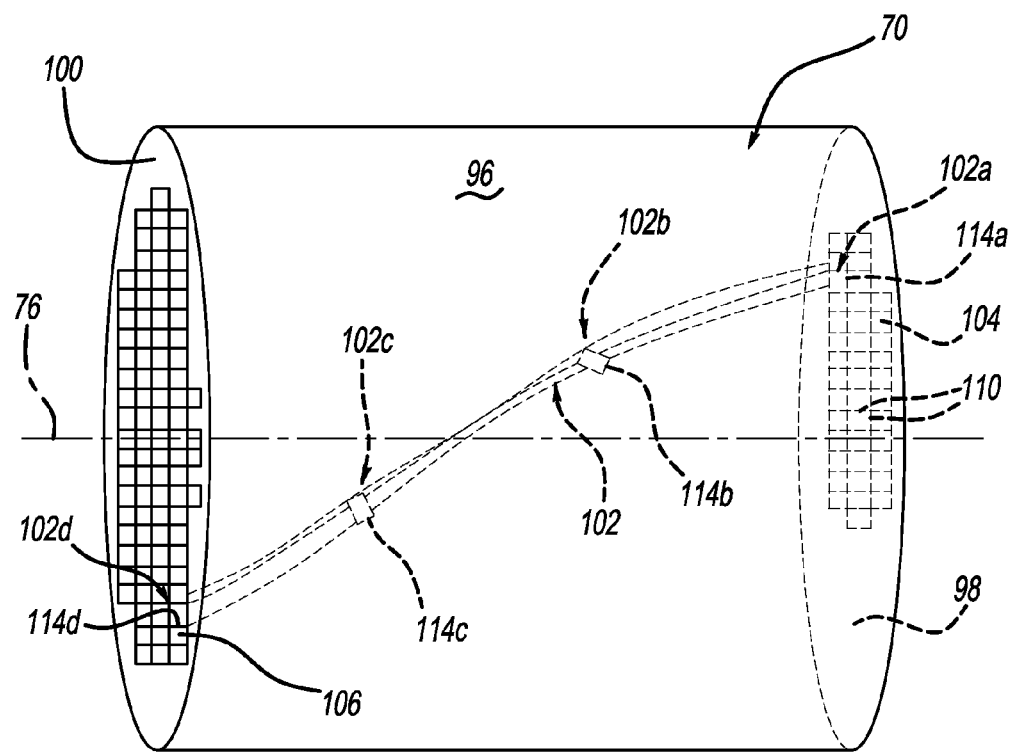
FIG. 3 is a perspective view of a catalytic substrate of the catalytic converter of FIG. 2, illustrating a flow channel path of a first construction.
Figure 3:
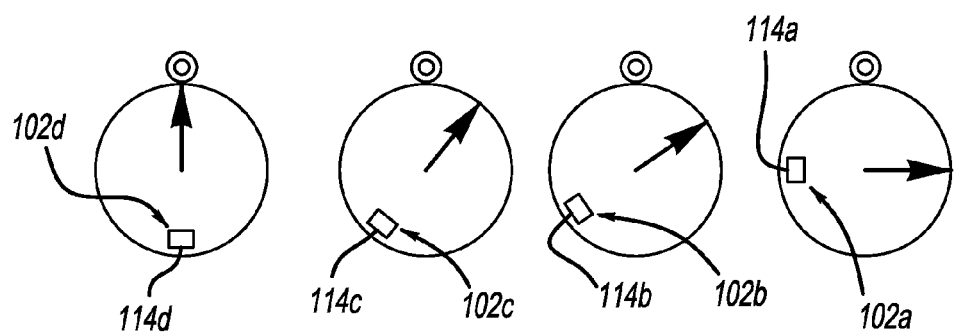

With additional reference to FIG. 3, the catalytic substrate 70 is illustrated in greater detail. The catalytic substrate 70 can include a body section 96 disposed within the internal chamber 58 (FIG. 2). The body section 96 can be cylindrical and can have a generally circular cross-section, though other configurations can be used. The body section 96 can include a planar inlet face 98 and a planar outlet face 100.

The body section 96 can define a plurality of flow channels 102 that are formed in the catalytic substrate 70 and extend between the inlet face 98 and the outlet face 100. The untreated exhaust gases, received from the engine 16 (FIG. 1) through the inlet end cone 54 (FIG. 2), can initially contact the inlet face 98 and be directed into an inlet 104 of each of the flow channels 102. As the exhaust gas flows through the flow channels 102, it can contact the catalyst-treated side-walls of the flow channels 102 before being discharged through an outlet 106 of each of the flow channels 102 to exit the housing through the outlet end cone 56 (FIG. 2). The treated gases can be discharged through the outlet end cone 56 (FIG. 2) to the tail pipe 30 (FIG. 1).

In the example provided, the flow channels 102 can be formed to be non-linear between their respective inlets 104 and outlets 106. In particular, the term "skewed" will hereafter be used to describe and define the non-linear properties of the flow channels 102 and is intended to encompass configurations of the flow channels 102 that are rotated, indexed, clocked, twisted, slanted, obliquely-aligned and/or angulated, either partially or completely, along their length and which have a central flow axis that is not parallel to and/or concentric with the central axis 76 of the catalytic converter 24. The skewed flow channels 102 can generate stronger turbulence and a more controlled exhaust flow by spinning the exhaust gases.

In the example provided, at least one flow channel 102 follows a skewed path between its corresponding inlet 104 and outlet 106. While FIG. 3 illustrates the path of a single one of the flow channels 102, it is understood that a plurality of the inlets 104 are associated with the inlet face 98 and communicate with a plurality of outlets 106 associated with the outlet face 100 via a series of flow channels. While not specifically shown, those skilled in the art will appreciate that these additional flow channels can also be skewed and may, for example, be similarly configured to the single exemplary flow channel 102 shown. It is also understood that these additional flow channels 102 can alternatively follow dissimilar paths between their respective inlets 104 and outlets 106.

In the example provided, the flow channel 102 follows a generally curved (e.g. arcuate or helical) path about the central axis 76 of the catalytic substrate 70, though other configurations can be used. FIG. 3 illustrates the walls 110, and more specifically an outer wall 114a, 114b, 114c, 114d, of the flow channel 102 at four locations between its inlet 104 and outlet 106. The first location (e.g. at inlet face 98) is indicated by reference numeral 102a. The second location is indicated by reference numeral 102b. The third location is indicated by reference numeral 102c. The fourth location (e.g. at outlet face 100) is indicated by reference numeral 102d. The outer wall 114a, 114b, 114c, 114d can remain radially outward of the other walls of the flow channel 102 as the flow channel 102 rotates or curves about the axis 76. While the flow channel 102 is illustrated as having a generally rectangular cross-section, it is understood that other shapes can be used (e.g. polygonal, circular, ovoid).

FIG. 3 also includes a clock face to clearly illustrate the indexing or rotation of the flow channel 102 between the inlet face 98 and the outlet face 100. In the example provided, the flow channel 102 follows along a continuous arcuate or helical path to define a rotational clocking of 90° between the inlet 104 and the outlet 106, though other rotational clocking magnitudes can be used. In an alternative construction, not specifically shown, the flow channel 102 can be rotationally indexed through different angular ranges along different longitudinal segments of the catalytic substrate 70 to provide distinct arcuate segments which can facilitate greater turbulence in a particular location along the catalytic substrate 70. According to another alternate construction, not specifically shown, a portion of the flow channel 102 can be linear along a longitudinal segment of the catalytic substrate 70 and can be interconnected with the rotationally indexed portions of the flow channel 102.

With additional reference to FIG. 4, a second example of a catalytic substrate 70' is illustrated. The catalytic substrate 70' can be similar to the catalytic substrate 70 (FIGS. 2 and 3), except as otherwise shown or described herein. Accordingly similar reference numerals denote similar elements as those described above with reference to the catalytic substrate 70 (FIGS. 2 and 3). In the example shown in FIG. 4, at least one of the flow channels 102' can follow a curved (e.g. arcuate or helical) path about an axis 410 that is not coaxial with the central axis 76' of the catalytic substrate 70'.

In the example provided, the axis 410 is parallel to and offset from the central axis 76', though other configurations can be used. In an alternative construction, not specifically shown, at least one of the flow channels 102' can follow an irregularly curved path, such as a path that does not curve continuously at a constant radius about a single axis for example.

With additional reference to FIG. 5, a cross-sectional view of one of the flow channels 102 is illustrated. The walls 110 can include an outer wall 114 (e.g. 114a, 114b, 114c, or 114d), an inner wall 118, and a pair of side walls 122. A first layer 130 of catalyst material can be affixed to the outer wall 114 to line the flow channel 102 along the outer wall 114. A second layer 134 of catalyst material can be affixed to the inner wall 118 to line the flow channel 102 along the inner wall 118. A third layer 138 of catalyst material can be affixed to one side wall 122, and a fourth layer 142 of catalyst material can be affixed to the other side wall 122 to line the flow channel 102 along the side walls 122. The catalyst material can be any suitable material configured to catalyze reactions between the combustion products in the untreated exhaust gases to produce more desirable emissions.

In the example provided, the first layer 130 can be thicker than the second layer 134, and the thickness of the third and fourth layers 138, 142 can transition from the thickness of the first layer 130 to the thickness of the second layer 134. In operation, as exhaust gases flow through the curved path of the flow channel 102, centrifugal force results in more exhaust gas contacting the outer wall 114 than the inner wall 118. Thus, the first layer 130 is thicker and can have more catalyst material to contact the greater amount of exhaust gas located proximate to the outer wall 114. The thicknesses of the first, second, third, and fourth layers 130, 134, 138, 142 can also optionally vary with axial position along the length of the flow channel 102.

Figure 6:
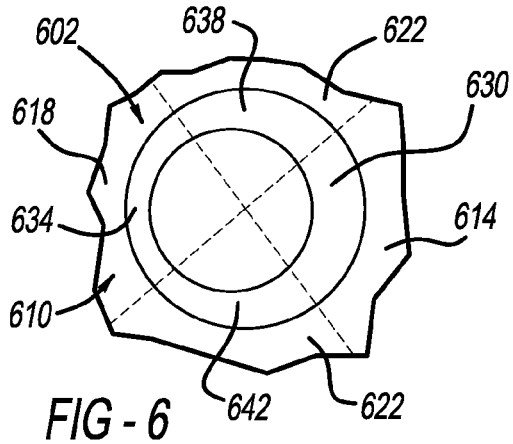
FIG. 6 is a sectional view similar to FIG. 5, illustrating a flow channel cross-sectional shape and catalyst coating of a second construction.

With additional reference to FIG. 6, a cross-sectional view of a flow channel 602 of a second construction is illustrated. The flow channel 602 can be similar to the flow channels 102 (FIG. 3) except as otherwise shown or described herein. In the example provided, the flow channel 602 can be defined by a wall 610 that has a generally circular shaped cross-section, though other configurations can be used (e.g. ovoid). The wall 610 can be similar to the walls 110 (FIG. 3) except as otherwise shown or described herein. The wall 610 can have an outer wall portion 614, an inner wall portion 618, and a pair of side wall portions 622. In the example provided, these wall portions 614, 618, 622 are generally quadrants of the flow channel 602, though other configurations can be used.

A first layer 630 of catalyst material can be affixed to the outer wall portion 614 to line the flow channel 602 along the outer wall portion 614. A second layer 634 of catalyst material can be affixed to the inner wall portion 618 to line the flow channel 602 along the inner wall portion 618. A third layer 638 of catalyst material can be affixed to one side wall portion 622, and a fourth layer 642 of catalyst material can be affixed to the other side wall portion 622 to line the flow channel 602 along the side wall portions 622.

In the example provided, the first layer 630 can be thicker than the second layer 634, and the thickness of the third and fourth layers 638, 642 can transition from the thickness of the first layer 630 to the thickness of the second layer 634. The thicknesses of the first, second, third, and fourth layers 630, 634, 638, 642 can also optionally vary with axial position along the length of the flow channel 602.

Figure 7:
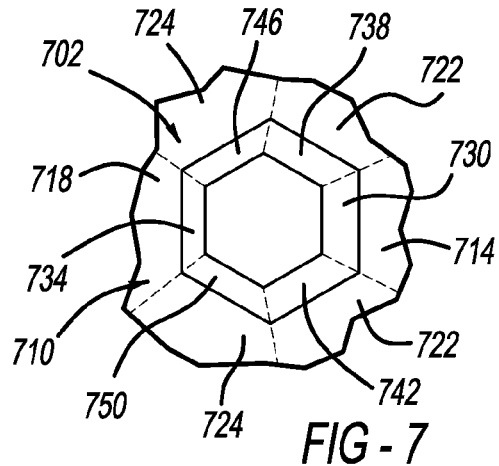
FIG. 7 is a sectional view similar to FIG. 5, illustrating a flow channel cross-sectional shape and catalyst coating of a third construction.

With additional reference to FIG. 7, a cross-sectional view of a flow channel 702 of a third construction is illustrated. The flow channel 702 can be similar to the flow channels 102 (FIG. 3) except as otherwise shown or described herein. The flow channel 702 can be defined by walls 710 that can define a generally polygonal shaped cross-section (e.g. triangular, rectangular, pentagonal, etc.). In the example provided, the walls 710 define a generally hexagonal cross-section, though other configurations can be used. The walls 710 can be similar to the walls 110 (FIG. 3) except as otherwise shown or described herein. The walls 710 can have an outer wall 714, an inner wall 718, a pair of first side walls 722, and a pair of second side walls 724.

A first layer 730 of catalyst material can be affixed to the outer wall 714 to line the flow channel 702 along the outer wall 714. A second layer 734 of catalyst material can be affixed to the inner wall 718 to line the flow channel 702 along the inner wall 718. A third layer 738 of catalyst material can be affixed to one of the first side walls 722, and a fourth layer 742 of catalyst material can be affixed to the other one of the first side walls 722 to line the flow channel 702 along the first side walls 722. A fifth layer 746 of catalyst material can be affixed to one of the second side walls 724, and a sixth layer 750 of catalyst material can be affixed to the other one of the second side walls 724 to line the flow channel 702 along the second side walls 724.

In the example provided, the first layer 730 can be thicker than the second layer 734, and the thickness of the third, fourth, fifth, and sixth layers 738, 742, 746, 750 can transition from the thickness of the first layer 730 to the thickness of the second layer 734. The thicknesses of the first, second, third, and fourth layers 730, 734, 738, 742, 746, 750 can also optionally vary with axial position along the length of the flow channel 702.

Figure 8:
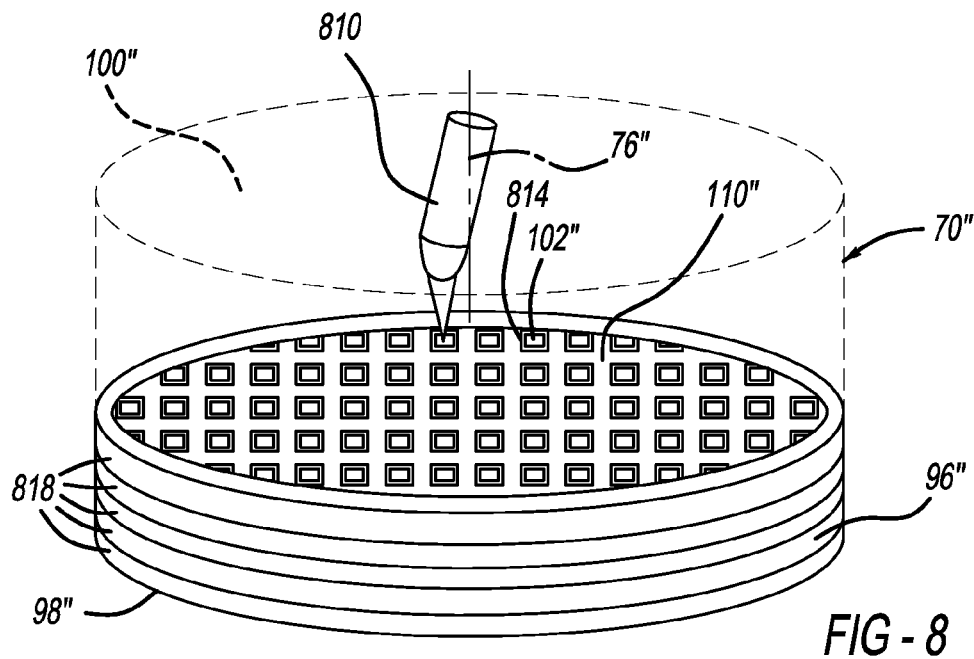
FIG. 8 is a perspective view of a portion of a catalytic substrate similar to the catalytic substrate of FIGS. 2 and 3, illustrating a portion of a three-dimensional printer.

With additional reference to FIG. 8, a portion of a catalytic substrate 70" is illustrated. The catalytic substrate 70" can be similar to the catalytic substrates 70, or 70' (FIG. 3 or 4) except as otherwise shown or described herein. In FIG. 8, a portion of a three-dimensional printer 810 is also illustrated. The walls 110" can define the flow channels 102" of the catalytic substrate 70" similar to the flow channels 102, 102' (FIGS. 2-5), the flow channels 602 (FIG. 6), or the flow channels 702 (FIG. 7). The flow channels 102" can be lined with layers 814 of catalyst material that can be similar to the layers 130, 134, 138, 142 (FIG. 5), the layers 630, 634, 638, 642 (FIG. 6), or the layers 730, 734, 738, 742, 746, 750 (FIG. 7), respectively.

The catalytic substrate 70" and layers 814 can be "printed" three-dimensionally by the three-dimensional printer 810. The three-dimensional printer 810 can selectively deposit substrate particles (e.g. cordierite particles) that make up the body section 96" of the catalytic substrate 70" and walls 110". The three-dimensional printer 810 can deposit these substrate particles layer by layer (e.g. shown as layers 818). The substrate particles can be mixed with a bonding agent (e.g. an adhesive) to bond the individual substrate particles together and to preceding layers 818 in order to form each subsequent layer 818.

The three-dimensional printer 810 can selectively deposit catalytic material particles that make up the layers 814 of catalyst material. The three-dimensional printer 810 can deposit these catalytic material particles layer by layer (e.g. layers 818) and adjacent to the walls 110" on the interior of the flow channels 102" to form the layers 814 of catalyst material. The three-dimensional printer 810 can deposit the catalytic material particles such that the layers 814 of catalyst material can have any suitable thicknesses along the walls 110", such as those shown in FIGS. 5-7 for example.

Figure 9:
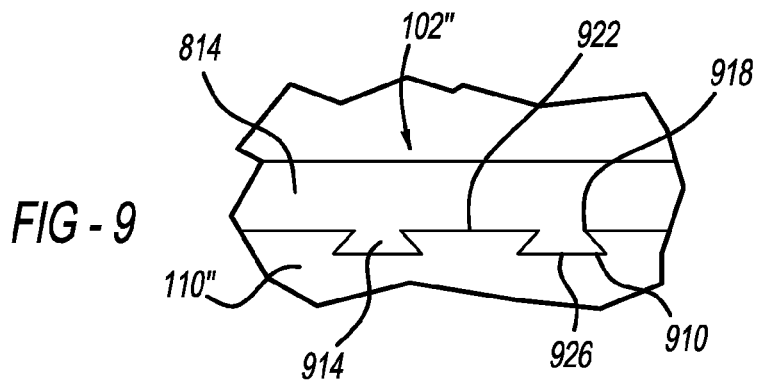
FIG. 9 is a sectional view of a portion of a catalytic substrate similar to the catalytic substrate of FIGS. 3 and 8, illustrating an interface between a catalytic material and a substrate material.

With additional reference to FIG. 9 as well as FIG. 8, an example of an interface between one of the layers 814 of catalyst material and one of the walls 110" is illustrated. The wall 110" can be printed by the three-dimensional printer 810 to have a key slot 910 and the layer 814 can be printed to have a key 914 disposed within the key slot 910. In the example provided, the key slot 910 can have a narrow opening 918 at an inner surface 922 of the wall 110" that opens into the flow channel 102". The key slot 910 can widen from the narrow opening 918 to a back face 926 of the key slot 910, though other configurations can be used. The key 914 can be printed to have a complementary shape to fill the key slot 910 and extend out of the narrow opening 918. The key 914 can be printed to be coupled with the portion of the layer 814 of the catalyst material that lines the inner surface 922 of the wall 110". In this way, the layer 814 of catalyst material can be securely coupled to the wall 110".

The three-dimensional printer can manufacture the catalytic substrate 70" by way of a method that includes first depositing a first one of the layers 818 of the catalytic substrate 70", then depositing a second one of the layers 818, followed by depositing sequential ones of the layers 818 until the entire catalytic substrate 70" is formed (e.g. from the planar inlet face 98" to the planar outlet face 100"). The step of depositing the first layer of the catalytic substrate 70" can include depositing a first layer of substrate particles and a first layer of catalytic material particles in predetermined discrete locations (e.g. corresponding to walls 110" and layers 814).

The step of depositing the second layer of the catalytic substrate 70" can include depositing a second layer of substrate particles and a second layer of catalytic material particles in predetermined discrete locations (e.g. corresponding to walls 110" and layers 814). Then subsequent layers of the catalytic substrate 70" can be deposited similar to the first and second layers 818. The layers 818 of substrate particles can cooperate to define the walls 110" and flow channels 102". The layers 818 of the catalytic material particles can cooperate to define the layers 814 of catalyst material.

While the three-dimensional printer 810 is illustrated as printing the layers 818 sequentially along the flow axis 76" (i.e. printing the layers 818 sequentially from the planar inlet face 98" to the planar outlet face 100"), it is understood that the three-dimensional printer 810 could print layers 818 sequentially in other orientations. For example, the layers 818 could be printed sequentially transverse to the flow axis 76" such that each layer 818 spans from the planar inlet face 98" to the planar outlet face 100".

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

What is claimed is:

1. A catalytic converter for modifying the composition of exhaust gas of an engine, the catalytic converter comprising:

a housing defining an inlet for receiving the exhaust gas from the engine, a main chamber in fluid communication with the inlet, and an outlet in fluid communication with the main chamber for exhausting the modified exhaust gas;

a substrate body disposed within the main chamber and defining a plurality of flow channels, the flow channels providing fluid communication between the inlet and the outlet; and a first layer of catalyst material providing a first section of the flow channels with a first overall wall thickness that is greater than a second overall wall thickness of a second section of the flow channels;

a second layer of catalyst material providing the second section of the flow channels with the second overall wall thickness, the second layer is opposite to the first layer, and the second layer has a thickness that is less than the first layer;

wherein a first flow channel of the plurality of flow channels defined in part by the first layer and the second layer extends along a curved path, the first layer having the first overall wall thickness is radially outward of the second layer having the second overall wall thickness relative to an axis of the curved path.

2. The catalytic converter of claim 1, wherein the axis is a central axis of the substrate body.

3. The catalytic converter of claim 1, wherein each of the plurality of flow channels follows a respective helical path about an axis of the substrate body.

4. The catalytic converter of claim 1, wherein the first layer lines the first section and the second layer lines the second section.

5. The catalytic converter of claim 4, further comprising a third layer of catalyst material that lines a third section of the flow channels, the third layer having a third thickness that transitions from the first thickness proximate to the first layer to the second thickness proximate to the second layer.

6. The catalytic converter of claim 1, wherein one of the first section or the first layer defines a key slot and the other of the first section or the first layer includes a key that is disposed within the key slot.

7. The catalytic converter of claim 1, wherein the key widens with increased distance into the key slot.

8. A catalytic converter for modifying the composition of exhaust gas of an engine, the catalytic converter comprising:

a housing defining an inlet for receiving the exhaust gas from the engine, a main chamber in fluid communication with the inlet, and an outlet in fluid communication with the main chamber for exhausting the modified exhaust gas;

a substrate body disposed within the main chamber and defining a plurality of flow channels that provide fluid communication between the inlet and the outlet, a first channel of the plurality of flow channels following a path that curves about an axis;

a first layer of catalyst material lining a first portion of the first channel, the first layer having a first thickness; and a second layer of catalyst material lining a second portion of the first channel, the second layer having a second thickness that is less than the first thickness, the first layer of the first channel is opposite to and radially outward of the second layer of the first channel relative to the axis, the first layer and the second layer together define a portion of the first channel.

9. The catalytic converter of claim 8, wherein the axis is a central axis of the substrate body.

10. The catalytic converter of claim 8, wherein the curved path curves helically about the axis.

11. The catalytic converter of claim 8, wherein each of the plurality of flow channels follows a respective helical path about the axis.

12. The catalytic converter of claim 8, further comprising a third layer of catalyst material lining a third portion of the first channel, the third layer having a third thickness that transitions from the first thickness proximate to the first layer to the second thickness proximate to the second layer.

13. The catalytic converter of claim 8, wherein one of the first portion or the first layer defines a key slot and the other of the first portion or the first layer includes a key that is disposed within the key slot.

* * * * *